Figure 1:
Figure 2:
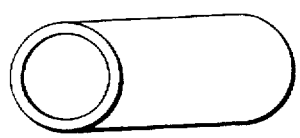

United States Patent [19]

Karst et al.

[11] Patent Number: 5,776,481

[45] Date of Patent: Jul. 7, 1998

[54] CONTROLLED-RELEASE DEVICE AND PREPARATION PROCESS

[75] Inventors: Christian Karst, Villeneuve Loubet; Thierry Gozlan, Cannes; Guy Derrieu, Cagnes-Sur-Mer; Luc Castelli, Saint Laurent Du Var, all of France

[73] Assignee: Laboratoires Virbac, Carros, France

[21] Appl. No.: 588,921

[22] Filed: Jan. 19, 1996

[30] Foreign Application Priority Data

Jan. 23, 1995 [FR] France ................... 95 00712

[51] Int. Cl.⁶ .................................................. A61D 7/00
[52] U.S. Cl. .................................. 424/411; 424/403
[58] Field of Search ........................ 424/403, 404, 424/411

[56] References Cited

U.S. PATENT DOCUMENTS

| | | | |
|---|---|---|---|
| 4,159,314 | 6/1979 | Ford | 424/411 |
| 4,830,860 | 5/1989 | Ranade | 424/486 |
| 4,879,117 | 11/1989 | Rombi | 424/411 |
| 5,338,533 | 8/1994 | Derrieu | 424/411 |

FOREIGN PATENT DOCUMENTS

| | | |
|---|---|---|
| 0 436 428 | 7/1991 | European Pat. Off. . |
| 2 386 253 | 11/1978 | France . |
| 2 447 679 | 8/1980 | France . |
| 882 016 | 5/1953 | Germany . |

*Primary Examiner*—Peter F. Kulkosky
*Attorney, Agent, or Firm*—Oblon, Spivak, McClelland, Maier & Neustadt, P.C.

[57] ABSTRACT

Device capable of being used in combination with a restraining or ornamental collar or with any other support for animals, intended to make possible the controlled and optically continuous and complete release of chemical substances, including medicaments, for more or less lengthy, continuous or noncontinuous, periods and process for producing the said device. The device comprises a polymeric matrix enclosing at least one active substance capable of being released towards an appropriate area of an animal. The device is composed of at least one tubular component of any cross-section, containing at least one layer of flexible polymeric matrix containing at least one active substance, the length of the said tubular component can be regulated to adjust the daily dose of the active substance to the weight of the animal and the ratio of the external surface area of said tubular component to the thickness of its' wall is as great as possible to obtain linear removal of the active substance.

12 Claims, 2 Drawing Sheets

CONTROLLED-RELEASE DEVICE AND PREPARATION PROCESS

The present invention relates to a device capable of being combined with a restraining or ornamental collar or with any other support for animals intended to make possible the controlled, and optionally continuous and complete, release of chemical substances, including medicaments, for more or less lengthy, continuous or non-continuous, periods, the said release of active substances according to predetermined kinetics, namely the release of a constant daily dose throughout the period of validity of the device, being carried out from an insoluble polymeric matrix towards the appropriate area of an animal organism.

The present invention also relates to the process for producing the said device.

A great many systems are already known which make possible the regulated and programmed release of active substances.

Solid systems which can be applied by contact, in particular on the skin, are also known.

Mention may in particular be made of devices capable of progressively releasing a contact insecticide intended for protecting animals against parasites, and in particular against ectoparasites. The majority of these devices are composed of an insecticide enclosed within a plastic matrix. The slow release of the ectoparasiticidal product (in the vapour form or in the form of a deposit on the hairs of the animal) makes possible effective protection against the parasites for a number of months.

A great many patents describe such devices:

French Patents 2,269,859, 2,307,466 and 2,447,679 on behalf of P. R. Dick et al. describe devices suitable for protecting animals against ectoparasites;

European Patent 0,436,428, on behalf of the Applicant Company, describes a device which makes possible the progressive, programmed, uniform and complete release of one or a number of active substances or principles;

other patents describe ectoparasiticidal compositions: French Patent 2,213,014, on behalf of R. Aries, French Patents 2,374,853, 2,386,253 and 2,386,254, on behalf of Bayer Aktiengesellschaft, and French Patents 2,370,572 and 2,392,606, on behalf of A. H. Robins Company Incorporated.

The combined devices described in these documents, which are essentially intended for producing antiparasitic collars, systems which make it possible to apply chemical substances by cutaneous contact, however exhibit a certain number of disadvantages:

in the majority of cases, they do not evenly release the active principle which they contain; in fact, the amount released at the beginning of use is very large, then it will very rapidly decrease to become zero; this is essentially due to the geometry of the system, which is in one piece and thick, in particular to be able to guarantee activity over very long periods, taking into account a single use, they are generally provided in the form of a strap fixed mainly to the neck of the animal and therefore do not make it possible to quantitatively determine the amount of active principle to be applied to the animal as a function of its weight; in fact, the amount of active principle is given by the length of the collar and therefore by the neck size of the animal and not by its weight. Taking into account the diversity of animals, it is obvious that the neck size of the animal is not proportional to its weight, they cannot be used as a restraining collar, for example for holding the animal on a lead, which requires that a second collar be worn, moreover, this type of device does not correspond to all the health needs of the animal, in particular when it is necessary to administer a number of substances simultaneously by the percutaneous route.

Although these various devices exhibit these disadvantages, the collar however remains one of the best systems for topical application of active substances by the percutaneous route to animals; in fact, the percutaneous route is very advantageous for treating, protecting or guarding from external attacks, and even internal attacks, an animal, because it is non-traumatizing and easy to use. In addition, the collar makes possible both systemic administration and administration by contact of the active principle or principles which it contains: the inner face of the collar, in contact with the skin, makes possible the transfer of the active principle or principles through the skin, whereas the outer face makes possible the complete coverage of the coat, due to the factors which are involved in the transfer of the active principle from the collar towards the animal: mechanical when the animal moves but also heat transmitted by the animal to the collar, hence the importance of the latter being in contact with the skin.

The aim of the present invention is consequently to provide a device which responds better to practical requirements than the previously known devices aimed at the same target, in particular:

in that it makes it possible to fully adjust the dose of active principle(s) to the body weight of the animal to be treated or to be protected, in that it makes it possible to regulate the period of protection and to comply with the therapeutic plan laid down by the active substance, in that it is easy to use, both for putting on and for taking off, in that it can be reused, and in that it makes possible the administration, on request and in particular simultaneously, of a number of substances.

The subject of the present invention is a device intended to be fixed to an animal, of the type comprising at least one polymeric matrix enclosing at least one active substance capable of being released from the said device towards an appropriate area of an animal organism, which device is characterized:

in that it is composed of at least one tubular component of any cross-section, containing at least one layer of flexible polymeric matrix containing at least one active substance, in that the length of the said tubular component can be regulated, in order to adjust the daily dose of active substance to the weight of the animal, in that the ratio of the external surface area of the said tubular component to the thickness of its wall is as great as possible, in order to obtain linear removal of the active substance, and in that the said tubular component is capable of being combined with any flexible or rigid support for animals.

The composition of the polymeric layer or layers of the device enclosing the active substance or substances is chosen in order to obtain activity over a given period.

In the present invention, inner face of the said device denotes the part of the external surface of the tubular component directly in contact with the animal and outer face denotes the part of the external surface of the tubular component which is not in direct contact with the animal.

In order to obtain the biggest possible ratio of the external surface area of the said tubular component to the thickness of its wall, the thinnest possible wall will preferably be chosen.

Depending in particular on the size of the animal, the type of active principle to be administered, the daily amount required, the period imposed and the composition of the polymeric matrix which influences the length and thickness of the tubular component or part of the tubular component containing the active principle, the thickness of the said tubular component is preferably between 0.1 mm and 10 mm and generally between 0.5 mm and 2.5 mm. The width or diameter of the tubular component is chosen so that the latter is suitable for the various commercially available supports.

Mention may be made, among supports onto which the device according to the invention can be fitted, of restraining or decorative collars, harnesses, halters, various straps or perches for birds and generally any support which can be inserted within the tubular structure of a device according to the invention.

Such a device exhibits a certain number of advantages:

it makes it possible fully to adjust the dose of active principle to the body weight of the animal, its specific shape (tubular component of any cross-section, the wall of which is low in thickness) makes possible linear removal of the active principle, it causes no damage to the support, which can be reused; indeed, the carrier support (collar, for example), in combination with the device, and the device itself are in no way damaged; thus, the device can be reused in order not to keep the animal under a longer medication than necessary, for example easy use of a sedative for backwards and forwards movements of an animal during journeys on going to a holiday resort; thus, the treatment will not be maintained throughout the period of the stay, it is easy to put the device on and to take it off the support for animals (collar, for example); consequently, the period of treatment is easily complied with and sequenced treatments can thus be scrupulously followed, it also has the advantage of being as universal as possible, that is to say suitable for all commercially available supports, due in particular to its versatility, which is made possible in particular by the low thickness of the wall of the said tubular component.

Unexpectedly, the device in accordance with the invention:

makes it possible to provide personalized medication for each animal in order to treat and/or to protect it. To do this, it is sufficient to position a device on the collar of the animal. A number of treatments can be applied simultaneously or modulated according to each of their therapeutic plans and makes it possible to comply with the dose required, as a function of the active principle content of the device and of the weight of the animal, by regulating the length of the device.

According to an advantageous embodiment of the said device, it contains a single layer of flexible polymeric matrix, within which is enclosed at least one active substance.

According to another advantageous embodiment of the said device, it contains at least two layers of flexible polymeric matric (external polymeric layer and internal polymeric layer).

According to an advantageous arrangement of this embodiment, at least one active substance is enclosed within the external layer (an inner part or face of which is directly in contact with the animal).

According to another advantageous arrangement of this embodiment, at least one active substance is enclosed within the internal layer (directly in contact with the support), in particular in order to make possible better regulation of the release of the said active substance, if necessary (passage of the active substance from the internal layer towards the external layer, before transfer proper to the animal).

In the present invention, a distinction is made, on the one hand, between the faces of the device (inner face and outer face), as specified above, and, on the other hand, the position of the layers of polymeric matrix in the said device; when it comprises, for example, two layers: the layer situated towards the outside is known as the external layer and the layer situated towards the inside is known as the internal layer: in such a case, the external layer will comprise an inner face (directly in contact with the animal) and an outer face.

According to yet another advantageous arrangement of this embodiment, at least one active substance is enclosed within each of the two layers of polymeric matrix.

According to yet another arrangement of this embodiment, a device in accordance with the invention can comprise three layers of polymeric matrix, namely an external layer and an internal layer, such as defined above, separated by an intermediate layer: the active principle or principles are advantageously found in the intermediate layer.

In accordance with the invention, one or a number of active substance(s) can be distributed homogeneously in one or a number of layers of polymeric matrix and/or one or a number of active substances can be concentrated preferentially in one or a number of fragments of one or a number of layers of polymeric matrix.

In accordance with the invention, at least one layer of polymeric matrix can additionally comprise at least one of the following adjuvants: plasticizer, lubricant, stabilizer, filler, dye, pigment, antioxidant, pore-forming agent, deodorant or fragrance.

For example, a layer of polymeric matrix charged with active substance(s) can also comprise at least one polymer, mixture of polymers or copolymer, at least one plasticizer, at least one lubricant, at least one stabilizer and at least one filler.

The plasticizers are advantageously liquid esters with a vapour pressure of less than 0.0001 mm/Hg at 25° C. Mention may be made, as non-limiting examples of plasticizers, of diethyl, di(2-ethylhexyl), dimethyl, dipropyl, dibutyl, dihexyl, dioctyl and didecyl phthalates, isobutyl, diisobutyl, dibutyl, di(2-ethylhexyl), diamyl, dinonyl, dioctyl and didecyl adipates, dipropyl, dibutyl, dibenzyl and dioctyl sebacates, diethyl, dipropyl and dibutyl citrates, tributyl acetylcitrate, triphenyl and tricresyl phosphates and triglycerides.

Preferred plasticizers are isobutyl adipate, di(2-ethylhexyl) adipate, diisobutyl adipate, di(2-ethylhexyl) phthalate, dibutyl phthalate and tributyl acetylcitrate.

Suitable lubricants are chosen according to the mixture to be converted and to the process used; in particular, for poly(vinyl chloride) and extrusion, the preferred lubricants are calcium, magnesium or potassium stearates, laurates and palmitates of these same metals and stearic acid.

Suitable stabilizers are chosen according to the polymer or mixtures of polymers; in particular, for poly(vinyl chloride), the preferred stabilizers are epoxides, such as epichlorohydrin and epoxidized soya oil, or metal soaps of metals such as calcium and zinc.

The fillers are preferably selected from inorganic fillers such as barium sulphate, calcium carbonate, zeolites, diatomaceous earths, kaolin, talc, silica, hydrated calcium silicate, antimony trioxide, titanium oxide, natural or synthetic textile fibres and sawdust.

The polymeric matrix can be produced from virtually any flexible plastic polymer or copolymer. Polymers which are suitable for the production of this matrix can in particular be chosen from the group which comprises vinyl polymers, polyethylenes, polypropylenes, polyacetates, polyurethanes and poly(vinyl acetates).

The choice of the said matrix depends on the active principle(s), on the desired period of activity and on the daily dose of active principle(s) to be released.

In the case where the device contains at least two layers, the polymeric matrices from which each of these layers is composed, as well as the adjuvants which they contain, can be identical or different in nature.

According to yet another advantageous embodiment, the device comprises a reinforcing frame.

The said reinforcing frame can be placed on the external layer or else, in the case where the said device comprises at least two layers of polymeric matrix, the said reinforcing frame is held as a sandwich between two of the said layers.

More precisely, the active principle or principles are chosen more particularly from the groups which comprise:

insecticides, such as, for example, diazinon, bendiocarb, amitraz, natural pyrethrums, synthetic pyrethroids, such as permethrin, phenothrin or lambdacyhalothrin, or piperonyl butoxide, ovicides or larvicides, such as, for example, fenoxycarb, methoprene or pyriproxyfen, repellants, such as, for example, citronella or N,N-diethyl-m-toluamidine, anti-emetics, dimenhydrinate, diphenhydramine, promethazine or L-hyoscine, antifungals and/or antibacterials, such as, for example, nanaomycin, miconazole, enilconazole, ketoconazole, chlorocresol, chloroxylenol, chlorhexidine and its derivatives, antibiotics, such as, for example, avermectins, such as ivermectin or abamectin, or milbemycins, such as moxidectin or doramectin, sulfamides, such as, for example, sulfadimidine, sulfamethazine, sulfamethoxypyridazine, sulfamethoxazole, trimethoprim or ormetoprim, quinolones and analogues, such as, for example, oxolinic acid or flumequine, antiinflammatories, such as, for example, piroxicam, flobufen, tepoxaline or nimesulide, vitamins, such as, for example, vitamin A or its derivatives, vitamin E or its derivatives, vitamin F and its esters or essential fatty acids, natural or synthetic deodorants, fragrances.

The device in accordance with the invention can exhibit many alternative forms both as regards the shape of its cross-section (circular, eliptical, semi-circular, lenticular, square, rectangular) and as regards the number of polymeric layers which it comprises, provided that it has the shape of a flexible tubular component.

The thickness and the nature of the wall of the said tubular component depend on the active principle or principles envisaged and on the desired period of activity. Nevertheless, a thin wall will be preferred, in order to have available a flexible and elastic device which is as suitable as possible for all commercial supports.

The polymeric layer or the external polymeric layer, in the case where the device comprises a number of layers, advantageously comprises a polymer, at least one plasticizer, at least one active principle and at least 5% of filler, in accordance with European Patent 0,436,428.

The device in accordance with the invention can be prepared by casting, injection moulding or by extrusion, in a way known to the person skilled in the art, by mixing and heating the various components.

The device in accordance with the invention can also be prepared in accordance with the process described and claimed in European Patent 0,436,428 and in particular comprises:

(a) the preparation of a powder comprising a polymeric matrix or resin in which at least one appropriate plasticizer is integrally absorbed, by hot spraying the said plasticizer, heated beforehand, onto the said temperature-controlled matrix, in order to saturate the said resin with plasticizer;

(b) cooling the powder obtained in (a) to a temperature of less than 30° C.;

(c) mixing, while cold, at least one active principle support with the powder obtained in (b), then (d) the addition, at a temperature of less than 30° C., of the active principle or principles; and (e) shaping as a tubular component.

In addition to the preceding arrangements, the invention also comprises other arrangements which will emerge from the description which will follow, which refers to implementational examples of the process which is the subject of the present invention and to the appended drawings, in which FIGS. 1 to 17 illustrate different embodiments of the tubular device according to the invention.

However, it must be clearly understood that these examples are given solely by way of illustration of the subject of the invention, of which they do not in any way constitute a limitation.

Figure 17:
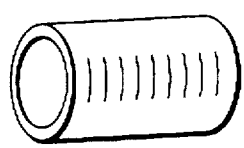

In accordance with the invention, the said device can be provided in any one of the following forms:

as single-layer hollow cylinder, of oval (FIG. 1) to round (FIG. 2) cross-section or indeed in the shape of a parallelepiped (FIG. 3), a hollow cylinder composed of two concentric layers of the same length (external layer E and internal layer I (FIG. 4)), of or not of the same composition, it being possible for the active principle or principles to be in one and/or the other layer, optionally in combination (the device is displayed with only half of the external layer, in order to show the internal layer), a hollow cylinder composed of one or two layers, which can be reinforced by a weaving or any other reinforcement R for the surface (FIGS. 5 and 6) or held as a sandwich between the two layers (FIG. 7), a hollow cylinder composed of two parts (a) and (b), either with a single layer (FIG. 8) or with two layers (FIGS. 9 and 10), the active principle or principles preferably being in the part (a) and the cross-section of the device preferably being oval or parallelepipedal, a hollow cylinder composed of three parts (a), (b) and (c), either with a single layer (FIG. 11) or with two layers (FIG. 12), the active principle or principles being combined or separate, preferably in the parts (a) and (c), the cross-section of the device preferably being oval or parallelepipedal, a hollow cylinder composed of one or two layers which can carry, on its external part, different decorative motifs (FIGS. 13 and 14) or inscriptions (FIG. 15), a hollow cylinder composed of two or three parts (a), (b) and/or (c), either with a single layer (such as FIG. 11) or with two layers (such as FIG. 12), it being possible for the parts (a), (b) and (c) to be different in thickness with respect to one another (FIG. 16), a hollow cylinder composed of one or two layers which can carry, on its external part, a graduated scale facilitating adjustment of the length of the device, and therefore of the active dose, to the weight of the bearer (FIG. 17).

When the device is composed of at least two layers, these layers can be different in nature, which makes it possible, for example:

to obtain selective leaktightness which makes it possible to guide the departure of the active principle or principles, and/or to prolong the activity of the device, and/or to regulate the departure of the active principle or principles, and/or to obtain a greater strength for the whole unit, and the like.

The device can also be composed of three concentric layers: an internal layer (a) which can be leakproof or porous, an intermediate layer (b) which comprises the active principle or principles and a porous external layer (c) which makes it possible to regulate the departure of the active principles.

EXAMPLE 1

The preparation is carried out by extrusion, in a conventional way, of flexible hollow cylindrical devices identical to those in FIG. 1, with an oval cross-section (large external diameter of the oval: 25 mm, large internal diameter of the oval: 23 mm, small external diameter of the oval: 12 mm, small internal diameter of 10 mm), with a length of 50 mm and a wall thickness of 1.0 mm and with a weight of 7 grams, containing 20% by weight of diazinon (O,O-diethyl O-(2-isopropyl-4-methyl-6-pyrimidyl thionophosphate), 3.5% of stabilizers and lubricants, 10.5% of plasticizer (isobutyl adipate), 35% of filler (calcium carbonate) and 31% of poly(vinyl chloride).

The kinetics of release of the diazinon were produced by causing 6 devices to be worn, in combination with leather collars, by dogs of Beagle breed with a weight of between 9 and 11 kg. Two 200 mg samples of the device are withdrawn using a hollow punch, one on the inner face and the other on the outer face, on each animal at different times and are analysed by high performance liquid chromatography.

The means of the diazinon values, as percentage remaining on the inner face and on the outer face of the devices, are given in Table I below.

TABLE I

| Withdrawal on the | Time given in days | | | | | | | |
|---|---|---|---|---|---|---|---|---|
| | 0 | 7 | 14 | 28 | 42 | 56 | 70 | 84 |
| inner face | 100 | 88.6 | 78.2 | 60.8 | 45.1 | 32.2 | 18.4 | 5.2 |
| outer face | 100 | 94.1 | 86.9 | 70.5 | 53.2 | 37.9 | 23.4 | 9.6 |

EXAMPLE 2

Figure 4:
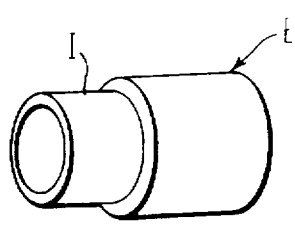
Figure 5:
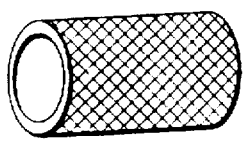
Figure 6:
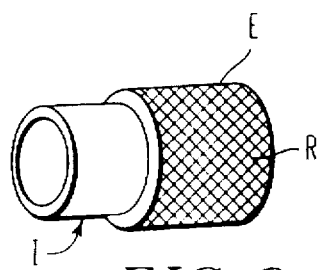

Similarly to Example 1, flexible hollow cylindrical devices identical to those in FIG. 4, with an oval cross-section (large external diameter of the oval: 25 mm, large internal diameter of the oval: 22.6 mm, small external diameter of the oval: 12 mm, small internal diameter of the oval: 9.6 mm), with a length of 50 mm and a wall thickness of 1.2 mm and with a weight of 8 grams, were produced with the inert internal layer composed of 3.5% of stabilizers and lubricants, 37.5% of plasticizer (di(2-ethylhexyl) phthalate) and 59% of poly(vinyl chloride) and the active external layer containing 15% by weight of amitraz (N-methyl-N'-2,4-xylyl-N-(N-2,4-xylylformimidoyl)formamidine), 3.5% of stabilizers and lubricants, 24.5% of plasticizer (di(2-ethylhexyl) adipate), 10% of filler (calcium carbonate) and 47% of poly(vinyl chloride).

The antiparasitic effectiveness was proved by causing 6 devices to be worn non-continuously, in combination with leather collars, by dogs of Beagle breed with a weight of between 9 and 11 kg. The devices were worn by the animals for three days at intervals of 14 days. The cycle was repeated 6 times, i.e. over three months. On the second day of wearing, 50 ticks were placed on each animal and on the third day the devices were removed and replaced in special bags where elimination of the insecticide was blocked, in order for the devices to be subsequently reused. On the same day, the ticks living on the animal or in its cage were counted.

No living or dead tick was found on the animals; only three living ticks were counted in the cages during the six periods and for all the animals.

EXAMPLE 3

Figure 3:
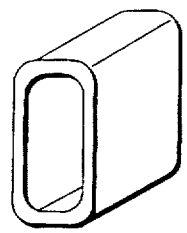
Figure 8:
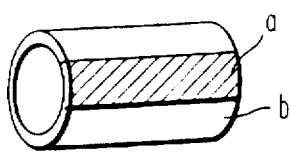
Figure 9:
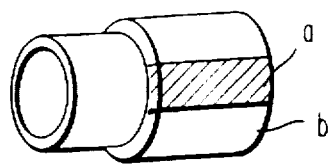
Figure 10:
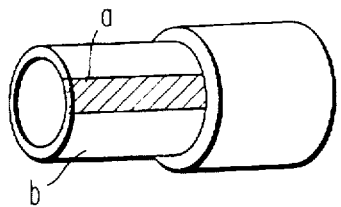

Similarly to Example 1, flexible hollow cylindrical devices identical to those in FIG. 8 but with a cross-section in the shape of a parallelepiped, as illustrated in FIG. 3 (external size of the large side of the parallelepiped: 25 mm; internal size of the large side of the parallelepiped: 23 mm, external size of the small side of the parallelepiped: 12 mm, internal size of the small side of the parallelepiped: 10 mm), with a length of 100 mm and a wall thickness of 1.0 mm and with a weight of 14 grams, were produced. The part (b), the inert body of the device, is composed of 3.5% of stabilizers and lubricants, 37.5% of plasticizer (di(2-ethylhexyl) phthalate) and 59% of poly(vinyl chloride) and the part (a), the active central strip with a width of 6 mm, is composed of 5% of L-hyoscine (scopolamine), 3.5% of stabilizers and lubricants, 30% of plasticizer (di(2-ethylhexyl) phthalate), 20% of filler (talc) and 41.5% of poly(vinyl chloride).

The anti-emetic effectiveness was proved by causing 6 devices to be worn non-continuously, in combination with restraining collars, by specific dogs of different breeds with a weight of between 5 and 20 kg which are particularly susceptible to travel sickness. The length of the devices was adjusted for each dog according to its weight. The devices were placed on the animals by their masters 24 hours before the trip and taken off on arrival, great care being taken to place the collar so that the active strip was inside the collar in order to be in contact with the skin. The devices, immediately on being taken off, were placed back in their packaging. The test was repeated a number of times (3 to 5 times) with the same dogs and devices. No vomiting nor any modification in the behaviour of the animals, mainly during the journey and on their arrival, was noticed.

In order to have an anti-emetic activity, a daily intake of 0.03 mg of L-hyoscine/kg of live weight is necessary. The content of the active strip, i.e. 5% (w/w), in order to obtain, during the period of wearing the device, continuously or non-continuously, an amount of active principle released of between 0.06 and 0.08 mg per cm and per day is determined experimentally.

The matrix/amount of active substance combination makes it possible to have 30 days of activity (consecutive or non-continuous, care being taken to replace the device in its packaging and to close it cautiously). Release is linear and independent of the length of the device or of the continuous or non-continuous wearing.

In this case, 0.5 cm of device protects 1 kg of live weight of dog. Thus, a sleeve tube of:

10 cm protects a dog weighing 20 kg, 5 cm protects a dog weighing 10 kg, 1 cm protects a dog weighing 2 kg.

EXAMPLE 4

Figure 7:
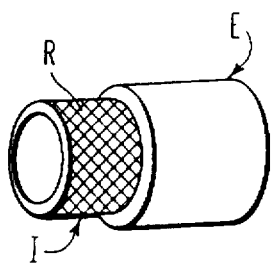

Similarly to Example 1, flexible hollow cylindrical devices identical to those in FIG. 7, with an oval cross-section (large external diameter of the large side of the oval: 18 mm, large internal diameter of the large side of the oval: 16.8 mm, small external diameter of the small side of the oval: 7.5 mm, small internal diameter of the small side of the oval: 6.3 mm), with a length of 40 mm and a wall thickness of 0.6 mm and with a weight of 6 grams, were produced with an inert internal layer composed of 3.5% of stabilizers and lubricants, 37.5% of plasticizer (di(2-ethylhexyl) adipate) and 59% of poly(vinyl chloride) and an active external layer containing 20% by weight of phenothrin (2,2-dimethyl-3-(2-methyl-1-propenyl) cyclopropanecarboxylate), 3.5% of stabilizers and lubricants, 18.5% of plasticizer (di(2-ethylhexyl) adipate) and 58% of poly(vinyl chloride).

The kinetics of release of the phenothrin were produced by causing 6 devices to be worn, in combination with leather collars, by cats with a weight in the region of 3.5 kg. Two 150 mg samples of the device were withdrawn using a hollow punch, one on the inner face and the other on the outer face, on each animal at different times and are analysed by high performance liquid chromatography.

The means of the phenothrin values, as percentage remaining on the inner face and on the outer face of the devices, are given in Table II below.

TABLE II

| withdrawal on the | Time given in days | | | | | | |
| --- | --- | --- | --- | --- | --- | --- | --- |
| | 0 | 7 | 14 | 28 | 42 | 56 | 70 |
| inner face | 100 | 82.0 | 76.3 | 60.1 | 45.5 | 32.1 | 19.2 |
| outer face | 100 | 82.9 | 78.8 | 63.8 | 50.4 | 37.8 | 27.4 |

EXAMPLE 5

Figure 11:
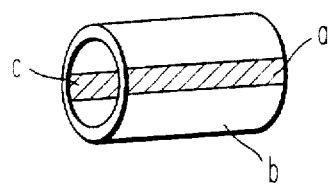
Figure 12:
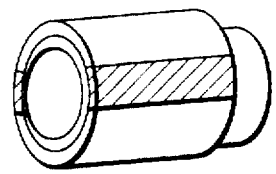
Figure 13:
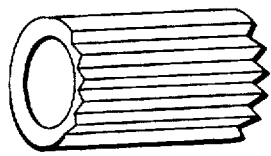
Figure 14:
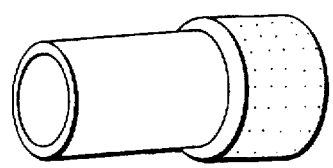
Figure 15:
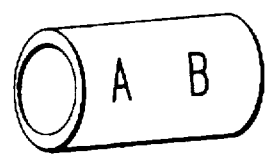
Figure 16:
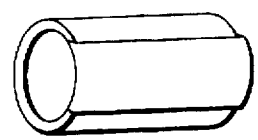

Similarly to Example 1, flexible hollow cylindrical devices identical to those in FIG. 11 but with a cross-section in the shape of a parallelepiped, as illustrated in FIG. 3 (external size of the large side of the parallelepiped: 18 mm, internal size of the large side of the parallelepiped: 16.8 mm, external size of the small side of the parallelepiped: 7.5 mm, internal size of the small side of the parallelepiped: 6.3 mm), with a length of 80 mm and a wall thickness of 0.6 mm and with a weight of 11 grams, were produced. The part (b), the inert body of the device, is composed of 3.5% of stabilizers and lubricants, 37.5% of plasticizer (di(2-ethylhexyl) phthalate) and 59% of poly(vinyl chloride) and the parts (a) and (c), the active central strips with a width of 6 mm, are composed of 2.5% of nanaomycin, 3.5% of stabilizers and lubricants, 25.5% of plasticizers (di(2-ethylhexyl) phthalate and dibutyl phthalate), 20% of filler (silica) and 48.5% of poly(vinyl chloride).

The antifungal and antibacterial effectiveness was proved by causing 6 devices to be worn continuously during the period of risk, in combination with collars, by cats which are free of ringworm. The length of the devices was adjusted for each cat according to its weight. The devices were placed on the animals before introducing them into a cattery infested by ringworm. The cats were removed from the cattery one month later and examined by fluorescence under a Wood's lamp. No micelium filament from Trychophyton sp. or Microsporum sp. was observed.

EXAMPLE 6

Similarly to Example 5, devices were produced containing in the part (b), the inert body of the device, 20% of plasticizer (diisobutyl adipate), 2% of lubricants, 40% of filler (calcium carbonate), 25% of polyethylene and 13% of vinyl acetate-polyethylene copolymer and in the parts (a) and (c), the active central strips with a width of 3 mm, 4.5% of pyriproxyfen, 20% of plasticizer (diisobutyl adipate), 2% of lubricants, 36.5% of filler (calcium carbonate), 25% of polyethylene and 12% of vinyl acetatepolyethylene copolymer.

The ovicidal effectiveness was proved by causing 6 devices to be worn continuously for 5 months, in combination with collars, by cats. The length of the devices was adjusted for each cat according to its weight. The devices were placed on the animals two days before an experimental infestation with 20 fleas per cat. 3 days after infestation, the eggs of the fleas were collected and placed in an incubator. No emergence of fleas was recorded for any of the cats. The same experiment with controls resulted in hatching of 50 to 60% of the eggs. The test was repeated every month for five months; no emergence of fleas was recorded.

EXAMPLE 7

Similarly to Example 1, devices, 100 mm long, containing 5% of a plant extract (fatty acid ester), 3.5% of stabilizers and lubricants, 30% of plasticizer (tributyl acetylcitrate), 21.5% of filler (calcium carbonate) and 40% of poly(vinyl chloride), were prepared.

The deodorant activity was proved by causing 6 devices to be worn continuously for 4 months, in combination with restraining collars, by old dogs, chosen particularly because they gave off unpleasant smells. The owners noticed a marked odoriferous improvement in the surroundings of their animals.

EXAMPLE 8

The preparation is carried out by extrusion moulding, in a conventional way, of flexible hollow cylindrical devices identical to those in FIG. 1, with an oval cross-section (external size of the large side of the oval: 40 mm, internal size of the large side of the oval: 36 mm, external size of the small side of the oval: 24 mm, internal size of the small side of the oval: 20 mm, with a length of 150 mm and a wall thickness of 2.0 mm and with a weight of 43 grams, containing 5% by weight of lambda-cyhalothrin, 10% of piperonyl butoxide, 2% of N,N-diethyl-m-toluamidine, 3.5% of stabilizers and lubricants, 23.5% of plasticizer (isobutyl adipate), 4% of filler (diatomaceous earths) and 52% of poly(vinyl chloride).

The effectiveness against flies was proved by causing 6 devices to be worn continuously during the 3 months of summer, in combination with the halters of 6 saddle horses from an equestrian centre. Very few flies were noticed around the heads of these animals, in comparison with the other horses from the centre.

6 other devices were used non-continuously. They were used in combination with the bellyband during the saddling of 6 other horses. The riders noticed the calm of the animals but, in addition, they were not bothered by flies and other insects.

6 other devices were worn, in combination with their halters, by 6 head of cattle during summering on mountain pastures. The breeders noticed the absence of insects in the vicinity of these head of cattle but in particular no clinical sign of keratoconjunctivitis and the absence of conjunctivitis with *Moraxiella bovis*.

In addition to that which emerges from the above, the invention is in no way restricted to those of its implementations, embodiments and application modes which have just been described more explicitly; on the contrary, it embraces all the variants thereof which can come to the mind of a technologist in the subject, without departing from the context or from the scope of the present invention.

What is claimed is:

1. A device in tubular form, having the same configuration when not in use and in use environment, made of a material comprising at least one flexible polymeric matrix enclosing at least one active substance capable of being released from said matrix, wherein said at least one active substance is at least released from the part of said matrix directly in contact with an animal, said matrix not being impermeable to the active substance, wherein the length of said device is regulatable, and is capable in use of releasing a daily dose of active substance related to the weight of the animal, wherein the thickness of the polymeric matrix comprising the active substance is between 0.1 mm and 10 mm, in order to obtain linear removal of the active substance, and wherein said device is capable of being combined with a flexible or rigid support for animals, and wherein said device has a shape selected from the groups illustrated in FIGS. 1–17 of the specification, and tubular shapes substantially equivalent thereto.

2. Device according to claim 1, comprising a single layer of flexible polymeric matrix within which is enclosed at least one active substance.

3. Device according to claim 1, comprising an external layer and an internal layer, each of flexible polymer matrix.

4. Device according to claim 3, wherein at least one active substance is enclosed within the external layer.

5. Device according to claim 3, wherein at least one active substance is enclosed within the internal layer.

6. Device according to claim 3, wherein at least one active substance is enclosed within each of the external layer and internal layer.

7. Device according to claim 1, comprising an external layer and an internal layer, separated by an intermediate layer, each of polymeric matrix, in which at least one active substance is enclosed.

8. Device according to claim 1, wherein at least one active substance is distributed homogeneously within a layer of polymeric matrix.

9. Device according to claim 1, wherein at least one active substance is concentrated preferentially in one or a number of fragments of one of the layers of polymeric matrix.

10. Device according to claim 1, additionally comprising a reinforcing frame.

11. Device according to claim 10, wherein said reinforcing frame is positioned on the external layer or, where said device comprises at least two layers of polymeric matrix, said reinforcing frame is held as a sandwich between two of the said layers.

12. Process for the preparation of the device according to any one of claims 1 to 11, which comprises mixing and heating the different components, followed by shaping them as a tubular component.

* * * * *